US012612880B2

(12) United States Patent
Gomez et al.

(10) Patent No.: US 12,612,880 B2
(45) Date of Patent: Apr. 28, 2026

(54) ENGINE LUBRICANT OPTIMIZATION FOR ADVANCED SUSTAINABLE FUELS

(71) Applicant: EXXONMOBIL TECHNOLOGY AND ENGINEERING COMPANY, Spring, TX (US)

(72) Inventors: Jose Alberto Gomez, Houston, TX (US); Zhisheng Gao, Flemington, NJ (US); David J. Abdallah, Moorestown, NJ (US); Eugine Choi, Flemington, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 23 days.

(21) Appl. No.: 18/976,009

(22) Filed: Dec. 10, 2024

(65) Prior Publication Data

US 2025/0215838 A1 Jul. 3, 2025

Related U.S. Application Data

(60) Provisional application No. 63/615,169, filed on Dec. 27, 2023.

(51) Int. Cl.
*F02D 19/12* (2006.01)
*C10M 107/02* (2006.01)
(Continued)

(52) U.S. Cl.
CPC ........... *F02D 19/12* (2013.01); *C10M 107/02* (2013.01); *C10M 169/04* (2013.01);
(Continued)

(58) Field of Classification Search
CPC ... F02D 19/12; C10M 107/02; C10M 169/04; C10M 2205/0206; C10M 2207/023;
(Continued)

(56) References Cited

U.S. PATENT DOCUMENTS

| | | | | |
|---|---|---|---|---|
| 12,339,271 B2 * | 6/2025 | Bachicha | ................. | G01N 1/10 |
| 2012/0004831 A1 * | 1/2012 | Miyagawa | .......... | F02D 41/0025 701/103 |

FOREIGN PATENT DOCUMENTS

| | | | | |
|---|---|---|---|---|
| DE | 102012221507 B3 * | 11/2013 | ......... | F02D 41/0025 |
| JP | 2012031869 A * | 2/2012 | | |
| RU | 2426116 C1 * | 8/2011 | | |

* cited by examiner

*Primary Examiner* — Syed O Hasan

(74) *Attorney, Agent, or Firm* — Vorys, Sater, Seymour and Pease LLP

(57) ABSTRACT

Fuel dilution of a lubricant in an engine may be reduced through adjustment methods. Example fuel dilution adjustment methods may include: storing a first fuel distillation dataset for a lubricant composition operating with a first fuel, a second fuel distillation dataset for the lubricant composition operating with a second fuel; calculating a first temperature factor for the first fuel at a reference temperature; calculating an optimized adjustment temperature; and adjusting an operational fuel dilution of the lubricant composition in an internal combustion engine based on the optimized adjustment temperature. Example lubricant compositions may maintain total deposits less than 10 mg from TEOST MHT4 (ASTM D7097) in the presence of a depositor compound, wherein the depositor compound comprises about 0.01 wt % to about 15 wt % diethyl benzene or about 0.01 wt % to about 15 wt % mesitylene.

18 Claims, 4 Drawing Sheets

(51) Int. Cl.
*C10M 169/04* (2006.01)
*F02M 25/00* (2006.01)
*C10N 30/00* (2006.01)
*C10N 30/10* (2006.01)
*C10N 40/25* (2006.01)

(52) U.S. Cl.
CPC .... *F02M 25/00* (2013.01); *C10M 2205/0206* (2013.01); *C10M 2207/023* (2013.01); *C10M 2215/26* (2013.01); *C10N 2030/10* (2013.01); *C10N 2030/54* (2020.05); *C10N 2040/25* (2013.01)

(58) Field of Classification Search
CPC ............... C10M 2215/26; F02M 25/00; C10N 2030/54; C10N 2030/10; C10N 2040/25
See application file for complete search history.

ENGINE LUBRICANT OPTIMIZATION FOR ADVANCED SUSTAINABLE FUELS

FIELD OF INVENTION

This application relates to methods and systems for optimizing engine lubricant operating parameters and compositions related thereto.

BACKGROUND

Conventional engine lubricants generally contain, among other things, an oil base stock, at least one antiwear additive to reduce friction between engine parts, at least one detergent to help maintain engine cleanliness, at least one dispersant to suspend contaminants in the oil, and at least one antioxidant, though compositions may vary.

Advanced sustainable fuels for use in internal combustion engines are increasing in use due to their potential for lower carbon dioxide emissions. Advanced sustainable fuels may include, but are not limited to, for example, e-fuels, synthetic fuels, ethanol to gasoline and methanol to gasoline fuels, biofuels, fuels from industrial wastes, the like, or any combination thereof. Advanced sustainable fuels may be more susceptible to causing fuel dilution in engine lubricant than conventional fuels, due to advanced sustainable fuels may contain more heavier molecules than conventional fuels and be more likely to accumulate in engine lubricant.

Fuel dilution of engine lubricant occurs when excess fuel accumulates in the lubricant. Fuel dilution may reduce lubricant operating performance through reduction in lubricating ability, increased oil volatility, and subsequently increased deposit and wear of engine components. Such effects may lead to a need to more frequently replace the oil and/or may cause damage to components of the internal combustion engine.

SUMMARY OF INVENTION

A first nonlimiting method of the present disclosure may include: storing in computer-readable memory a first fuel distillation dataset for a lubricant composition operating with a first fuel, a second fuel distillation dataset for the lubricant composition operating with a second fuel; calculating with at least one processor a first temperature factor for the first fuel at a reference temperature, wherein the first temperature factor is a function of the first fuel distillation dataset and the reference temperature; calculating with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature; and adjusting an operational fuel dilution of the lubricant composition in an internal combustion engine based on the optimized adjustment temperature, wherein the internal combustion engine is operating on the second fuel.

A first nonlimiting example system of the present disclosure, for lubricating an internal combustion engine having a lubricant composition therein, may include: a viscosity sensor for measuring an operational lubricant viscosity of the lubricant composition; an engine computer in communication with the viscosity sensor, wherein the engine computer includes at least one processor and the computer-readable memory and is configured to: store in the computer-readable memory a first fuel distillation dataset for the lubricant composition operating with a first fuel, a second fuel distillation dataset for the lubricant composition operating with a second fuel, wherein the internal combustion engine is operating on the second fuel; calculate with the at least one processor a first temperature factor for the first fuel at a reference temperature, wherein the first temperature factor is a function of the first fuel distillation dataset and the reference temperature; calculate with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature; and initiate an adjustment signal, wherein the adjustment signal adjusts an operational fuel dilution of the lubricant composition based on the optimized adjustment temperature.

A first nonlimiting example lubricant composition of the present disclosure may include: at least one hydrocarbon basestock, about 0.50 wt % to about 1.0 wt % of at least one aminic antioxidant, and about 0.50 wt % to about 1.0 wt % of at least one phenolic antioxidant; and wherein weight percentages are of a total weight of the lubricant composition, and wherein the lubricant composition has less than 10 mg total deposits from TEOST MHT4 (ASTM D7097).

These and other features and attributes of the disclosed compositions and of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

This application relates to methods and systems for optimizing engine lubricant operating parameters.

The present disclosure allows for operation of lubricant compositions with mitigated fuel dilution in an internal combustion engine operating with advanced sustainable fuels. Advanced sustainable fuels, while allowing for more sustainable powering of internal combustion engines may lead to increased fuel dilution of lubricating oils, requiring mitigation. Methods and systems of the present disclosure may enable mitigation through optimized adjustment of engine parameters (e.g., operating temperature, blowby, the like, or any combination thereof).

As used herein "lubricant composition," "lubricant oil," "lubricating oil," "engine oil," "engine lubricant," and grammatical variations thereof refer to compositions used for lubrication within the engine block and/or other components of an internal combustion engine.

Figure 1:
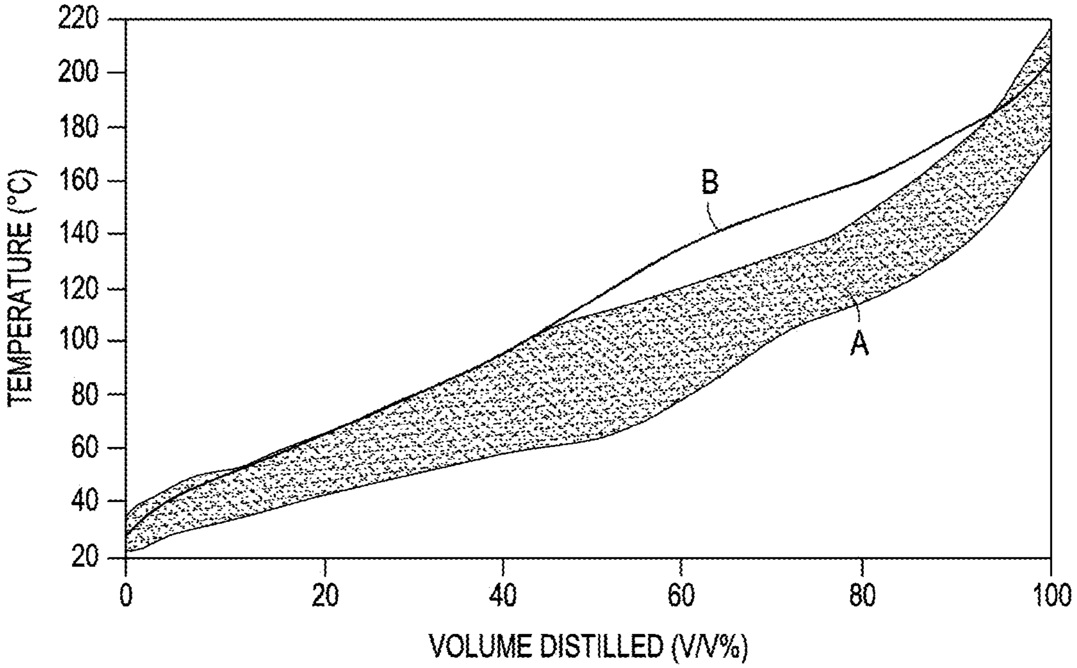
FIG. 1 is a graph showing nonlimiting example fuel distillation ranges.

Methods of the present disclosure may include wherein a method utilizes fuel distillation datasets (e.g., a fuel distillation curve) to find an optimized adjustment temperature for the engine operating temperature. Such adjustment may be necessary as by default an internal combustion engine may be configured to operate with a conventional fuel, not with an advanced sustainable fuel or another such fuel. Typical advanced sustainable fuels may generally have higher boiling point ranges than conventional fuels, potentially contributing to higher levels of fuel dilution when operated at conventional engine operating conditions (e.g., conditions optimized for a conventional fuel). A graph showing nonlimiting example fuel distillation ranges is shown in FIG. 1. As indicated by area A in FIG. 1, conventional fuels may have a larger area of lower boiling points than that for advanced sustainable fuels shown as curve B in FIG. 1. Upon operation with such advanced sustainable fuels without mitigation, fuel dilution of lubricant oils and subsequent deleterious effects may occur.

Figure 2:
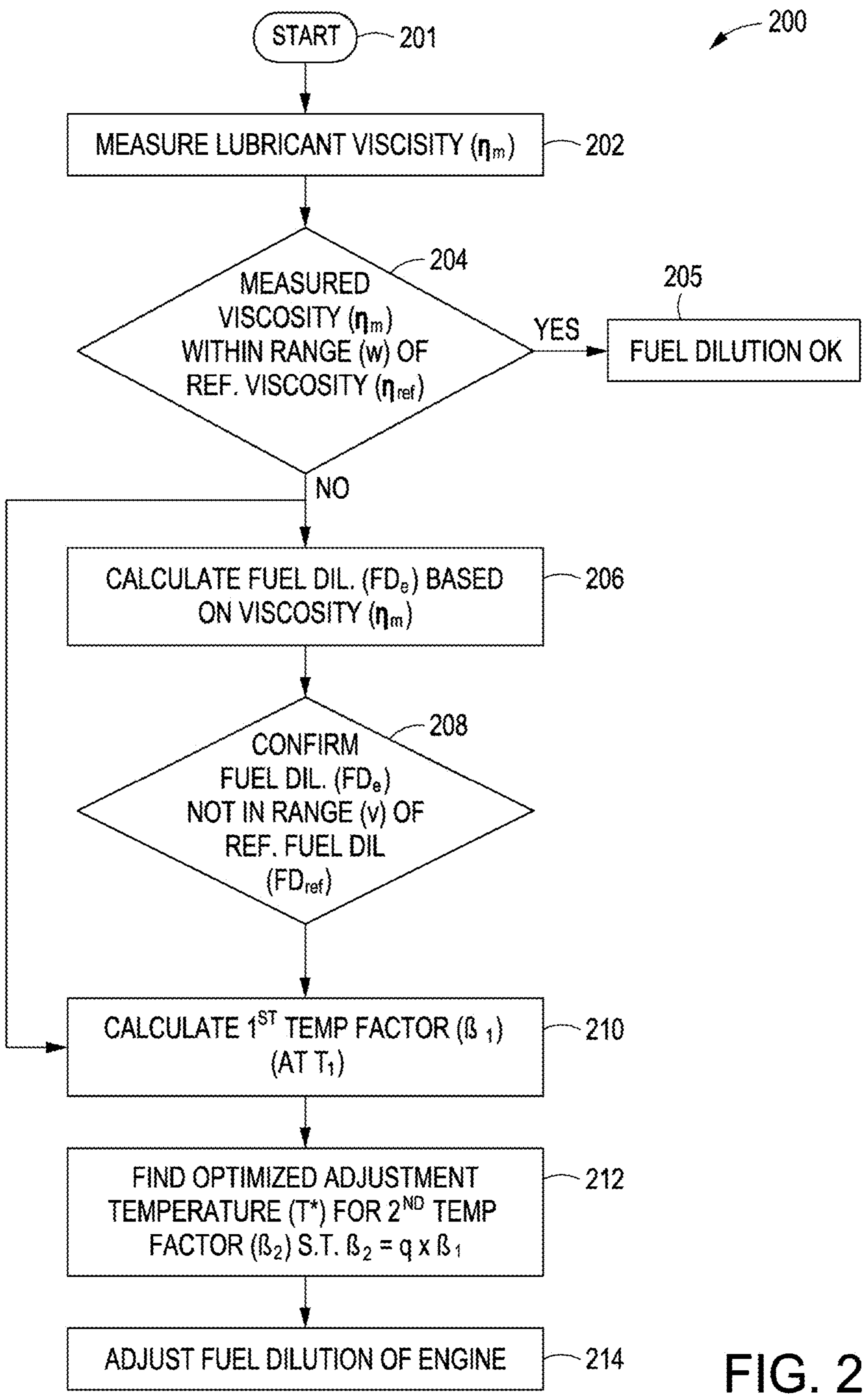
FIG. 2 is a flow chart of a nonlimiting example method according to the present disclosure.

A nonlimiting example method of the present disclosure may include method 200, as shown in a flow diagram in FIG. 2. Method 200 may include a starting block 201. Subsequently, lubricant viscosity ($\eta_m$) may be measured for an engine at block 202. The measured lubricant viscosity ($\eta_m$) may be considered an operational lubricant viscosity. The measured lubricant viscosity ($\eta_m$) may subsequently be compared to reference lubricant viscosity ($\eta_{ref}$) at block 204, wherein reference lubricant viscosity ($\eta_{ref}$) is for a corresponding temperature as the engine operating temperature. If the measured lubricant viscosity ($\eta_m$) is within a range (w) of the reference lubricant viscosity ($\eta_{ref}$), the fuel dilution is considered acceptable, as indicated at block 205. If the measured lubricant viscosity ($\eta_m$) is outside the range (w), the method may include calculating estimated fuel dilution ($FD_e$) based on the measured lubricant viscosity ($\eta_m$) at block 206. Subsequently, the method may include confirming that the estimated fuel dilution ($FD_e$) is not in a range (v) of a reference fuel dilution ($FD_{ref}$) at block 208. It should be noted that calculating estimated fuel dilution ($FD_e$) and confirming that the estimated fuel dilution ($FD_e$) is not in a range (v) of a reference fuel dilution ($FD_{ref}$) at blocks 206 and 208, respectively, may be optional. Subsequently, the method may include calculating a first temperature factor ($\beta_1$) at a first reference temperature ($T_1$). Furthermore, at block 212 the first temperature factor ($\beta_1$) may be used to find an optimized adjustment temperature ($T^*$) for a second temperature factor ($\beta_2$) and known tolerance factor (q) such that $\beta_2 = q \times \beta_1$. Based on the optimized adjustment temperature ($T^*$), the method may include adjustment of an operational fuel dilution within the engine at block 214.

It should be noted that elements of the nonlimiting example method described above may be executed in any suitable order and any suitable combination.

Measurement of lubricant viscosity ($\eta_m$) at block 202 may occur through use of a sensor within the internal combustion engine. Subsequently, checking if the measured lubricant viscosity ($\eta_m$) is within a range (w) of reference oil viscosity ($\eta_{ref}$) at block 204 may occur through any suitable means. Methods of blocks 204 through 212 may be carried out electronically through any suitable processor (e.g., a processor of an engine computer). The reference lubricant viscosity ($\eta_{ref}$) may be a lubricant viscosity expected with a given lubricant oil operating in an internal combustion engine with a reference (e.g., first) fuel at a standard engine operating temperature (e.g., the first reference temperature ($T_1$)). The reference lubricant viscosity ($\eta_{ref}$) may be stored within an engine computer. Indeed, it should be noted that the engine computer may store a plurality of reference lubricant viscosities at different temperatures, and/or may use any suitable mathematical methods to derive or otherwise approximate a reference lubricant viscosity at a given temperature, if necessary.

The range (w) may, for example, be a numerical range above and/or below the reference oil viscosity ($\eta_{ref}$) (e.g., ±10 cP), may be a percentage range above and/or below the reference lubricant viscosity ($\eta_{ref}$) (e.g., ±25%), or any other suitable range. It should be noted that in cases where the range (w) is a percentage, said percentage is calculated in relation to the reference lubricant viscosity ($\eta_{ref}$). Furthermore, it should be noted that the range (w) may be inclusive of endpoints or may be exclusive of endpoints.

If the measured lubricant viscosity ($\eta_m$) is within a range (w) of reference lubricant viscosity ($\eta_{ref}$), the measured lubricant viscosity ($\eta_m$) may be considered acceptable as indicated at block 205. Upon acceptable measured lubricant viscosity ($\eta_m$) a signal or other such means may be carried out, terminating the instance of a method of the present disclosure.

If the measured lubricant viscosity ($\eta_m$) is not within a range (w) of reference lubricant viscosity ($\eta_{ref}$), a method of the present disclosure may include calculating estimated fuel dilution ($FD_e$) based on the measured lubricant viscosity ($\eta_m$) at block 206. Calculating an estimated fuel dilution ($FD_e$) based on the measured lubricant viscosity ($\eta_m$) may occur using any suitable means including, but not limited to, a calculation using a mixture of multiple species equation as shown in Equation 1 below:

$$\ln\eta_m = X_{fuel}(\ln\eta_{fuel} + A_{fuel}) + X_{lube}(\ln\eta_{lube} + A_{lube}) + A_0 \quad (1)$$

where $\eta_m$ is the measured viscosity of a lubricant experiencing fuel dilution (a lubricant-fuel mixture), $\eta_{fuel}$ is the viscosity of the fuel alone at a reference temperature, $\eta_{lube}$ is the viscosity of the lubricant alone at a reference temperature. $\eta_{lube}$ may thus be equal to the reference lubricant viscosity ($\eta_{ref}$). Parameters including $\eta_{lube}$, $\eta_{fuel}$, $A_0$, $A_{fuel}$, and $A_{lube}$ may be calculated based on experimentation and stored for use (e.g., stored within an engine computer). For example, mixtures of the lubricant and the fuel may be prepared to derive to the $A_0$, $A_{fuel}$, and $A_{lube}$ parameters. $X_{fuel}$ and $X_{lube}$ are mass fractions of the fuel and lubricant, respectively, within a lubricant experiencing fuel dilution (a lubricant-fuel mixture). $X_{fuel}$ may be derived as $X_{lube}=1-X_{fuel}$. Subsequently, estimated fuel dilution ($FD_e$) may be calculated as $X_{fuel}$ is a measurement of $FD_e$, thus Equation 1 may be solved for $X_{fuel}$. Equation 1 may be solved for $X_{fuel}$ using any suitable method of equation solving, including any combination thereof. Example methods of equation solving may include, but are not to be limited to, fixed-point iteration (e.g., Newton's method), Brent's method, Ridder's method, secant method, and the like.

Subsequently, a method of the present disclosure may include confirming that the estimated fuel dilution ($FD_e$) is not in a range (v) of a reference fuel dilution ($FD_{ref}$) at block 208. The range (v) may, for example, be a numerical range above and/or below the reference fuel dilution ($FD_{ref}$), may be a percentage range above and/or below the reference fuel dilution ($FD_{ref}$) (e.g., ±25%), or any other suitable range. It should again be noted that block 206 and block 208 may each be optional or may be executed in any combination.

Upon optional execution of blocks 206 and 208 as indicated herein, a method of the present disclosure may include calculating a first temperature factor ($\beta_1$) at a first reference temperature ($T_1$) at block 210. The first temperature factor ($\beta_1$) may be for the given lubricant oil operating in an internal combustion engine with a reference (e.g., first) fuel at the first reference temperature ($T_1$). Calculating a temperature factor ($\beta$) may be a function of weight fraction percentages ($x_i$) and average boiling temperatures ($T_i$) for each weight fraction (i) within a distillation dataset (e.g., a distillation curve) for a fuel. Such distillation data may be obtained according to ASTM D86; methods of the present disclosure may include calculation of at least a portion of such a distillation dataset, including, for example, calculation of a distillation dataset in a preprocessing step. Methods of the present disclosure may additionally include obtaining distillation data for use in methods of the present disclosure through any suitable means including, but not limited to, for example, a laboratory means, a mobile testing system, the like, or any combination thereof. Methods of the present disclosure may include storing a distillation dataset, and furthermore may include requesting the distillation dataset from a server and downloading the distillation dataset to an engine computer.

The distillation dataset used for calculating the first temperature factor ($\beta_1$) may comprise a first fuel distillation dataset for a first fuel (e.g., a conventional fuel). A temperature factor ($\beta$) may be calculated according to Equation 2 below.

$$\beta = \sum_i x_i * \alpha_i \tag{2}$$

where $\alpha_i$ is an individual temperature factor for a weight fraction (i) in the distillation dataset according to Equation 3 below.

$$\alpha_i = \exp\left(-T_i(4 + \ln(T_i))\left[\frac{1}{T} - \frac{1}{T_i}\right]\right) \tag{3}$$

For calculation of the first temperature factor ($\beta_1$), temperature (T) is equal to the first reference temperature ($T_1$). It should be noted that temperatures used in Equations 2 and 3 are to be expressed in absolute terms (e.g., Kelvin (K)).

A nonlimiting example first fuel distillation dataset is shown in Table 1 below, along with calculated individual temperature factors ($\alpha_i$) for each weight fraction, and calculated products of individual weight fraction percentages ($x_i$) and individual temperature factors ($\alpha_i$). It should be noted that in some embodiments the calculated individual temperature factors ($\alpha_i$) and products of individual weight fraction percentages ($x_i$) and individual temperature factors ($\alpha_i$) may be calculated in a preprocessing step and included in fuel distillation datasets.

TABLE 1

Example first fuel distillation dataset.

| Boiling Point Fraction | Fraction weight % ($x_i$) | Average Fraction Temp. (K) ($T_i$) | $\alpha_i$ | $x_i * \alpha_i$ |
|---|---|---|---|---|
| T5 | 5 | 315.3 | 3.620 | 0.014 |
| T10 | 5 | 323.3 | 2.924 | 0.017 |
| T20 | 10 | 328.0 | 2.580 | 0.039 |
| T30 | 10 | 335.4 | 2.117 | 0.047 |
| T40 | 10 | 348.9 | 1.472 | 0.068 |
| T50 | 10 | 365.5 | 0.939 | 0.106 |
| T60 | 10 | 376.8 | 0.689 | 0.145 |
| T70 | 10 | 383.5 | 0.573 | 0.174 |
| T80 | 10 | 390.5 | 0.472 | 0.212 |
| T90 | 10 | 404.0 | 0.325 | 0.308 |
| T95 | 5 | 421.9 | 0.197 | 0.254 |
| Final Boiling Point | 5 | 443.8 | 0.106 | 0.470 |

For the example first fuel distillation dataset shown in Table 1 above, the temperature (T) is equal to a first reference temperature such that $T_1$=363.15K. Based on the example first fuel distillation dataset shown in Table 1, a first temperature factor ($\beta_1$) may be calculated to be 1.85.

Furthermore, a method of the present disclosure may include using a first temperature factor ($\beta_1$) to find an optimized adjustment temperature (T*) for a second temperature factor ($\beta_2$) and known tolerance factor (q) such that $\beta_2 = q \times \beta_1$, where the second temperature factor ($\beta_2$) is to be calculated at and is a function of the adjustment temperature ($T_a$). Subsequently, an adjustment temperature ($T_a$) may be found such that adjustment temperature ($T_a$) is equal to the optimized adjustment temperature (T*), as indicated at block 212. The distillation dataset used for calculating the second temperature factor $\beta_2$) may comprise a second fuel distillation dataset for a second fuel (e.g., an advanced sustainable fuel). Calculating the second temperature factor $\beta_2$) may be performed in accordance with temperature factor calculation methods described above herein.

A nonlimiting example second fuel distillation dataset is shown in Table 2 below.

TABLE 2

Example second fuel distillation dataset.

| Boiling Point Fraction | Fraction weight % ($x_i$) | Average Fraction Temp. (K) ($T_i$) |
|---|---|---|
| T5 | 5 | 314.1 |
| T10 | 5 | 322.3 |
| T20 | 10 | 330.4 |
| T30 | 10 | 342.0 |
| T40 | 10 | 356.7 |
| T50 | 10 | 375.1 |
| T60 | 10 | 394.9 |
| T70 | 10 | 412.7 |
| T80 | 10 | 427.6 |
| T90 | 10 | 442.2 |
| T95 | 5 | 456.2 |
| Final Boiling Point | 5 | 471.5 |

For the example second fuel distillation dataset shown in Table 2 above, the temperature (T) is equal to the optimized adjustment temperature (T*). Methods of the present disclosure may subsequently include finding T* based on the first temperature factor ($\beta_1$) and known tolerance factor (q).

Tolerance factor (q) may be dependent on fuel dilution limits from baseline fuel dilution; such fuel dilution limits being thus dependent on factors including, but not limited to, engine operating parameters, lubricant oil operating parameters, the like, or any combination thereof. A given fuel dilution limit's ratio in relation to baseline may yield tolerance factor (q). As a nonlimiting example, if a given combination of engine and lubricant oil can tolerate a 20% increase in fuel dilution from a fuel dilution baseline, tolerance factor (q) would be equal to 1.2. As a further nonlimiting example, if a given combination of engine and lubricant oil can tolerate a 35% increase in fuel dilution from a fuel dilution baseline, tolerance factor (q) would be equal to 1.35. The tolerance factor (q) may generally have a range from 0.5 to 2.5, or 1 to 2.5, or 1 to 2, or 1 to 1.5, or may be equal to 1; however, values outside the aforementioned ranges are additionally contemplated.

Solving of $\beta_2=q\times\beta_1$ to find T*, given a first fuel distillation dataset, a second fuel distillation dataset, and a first reference temperature ($T_1$) may be performed using any suitable method of equation solving, including any combination thereof. Example methods of equation solving may include, but are not to be limited to, fixed-point iteration (e.g., Newton's method), Brent's method, Ridder's method, secant method, and the like.

Given nonlimiting example data from first fuel distillation dataset (from Table 1), calculated example first temperature factor ($\beta_1$) (equal to 1.85), and example data from second fuel distillation dataset (from Table 2), a T* can be solved. Further given that q=1 in such an example, T*=389.4K. Such an example solution can be confirmed through calculation of individual temperature factors ($\alpha_i$) for each weight fraction of the second fuel distillation dataset with T=T*=389.4K, as well as calculation of products of individual weight fraction percentages ($x_i$) and individual temperature factors ($\alpha_i$) for the second fuel distillation dataset. Such calculation results are shown in Table 3 below.

TABLE 3

Example calculations from second fuel distillation dataset at T = T*.

| Boiling Point Fraction | $\alpha_i$ | $x_i * \alpha_i$ |
|---|---|---|
| T5 | 6.595 | 0.008 |
| T10 | 5.395 | 0.009 |
| T20 | 4.413 | 0.023 |
| T30 | 3.314 | 0.030 |
| T40 | 2.294 | 0.044 |
| T50 | 1.441 | 0.069 |
| T60 | 0.868 | 0.115 |
| T70 | 0.549 | 0.182 |
| T80 | 0.373 | 0.268 |
| T90 | 0.254 | 0.393 |
| T95 | 0.176 | 0.284 |
| Final Boiling Point | 0.118 | 0.425 |

Based on the example second fuel distillation dataset shown in Table 2 and subsequent calculations in Table 3, a second temperature factor ($\beta_2$) may be calculated to be 1.85, which is equal to the first temperature factor ($\beta_1$) multiplied by a tolerance factor (q) of 1.

Methods of the present disclosure may include adjusting an operational fuel dilution at block 214. Adjusting an operational fuel dilution may include adjusting an engine operating temperature based on the optimized adjustment temperature found in block 212. Methods of adjusting operational fuel dilution may preferably include adjusting radiator cooling of a radiator cooling system of the internal combustion engine. Such adjustment in radiator cooling may include reducing radiator cooling or increasing radiator cooling to adjust the engine operating temperature to be closer to the optimized adjustment temperature. Methods of the present disclosure may include use of a feedback loop including a temperature sensor within the engine for adjustment of engine operating temperature; such means of adjusting engine operating temperature using radiator cooling will be familiar to one of ordinary skill in the art and can be implemented in methods of the present disclosure with the benefit thereof.

Methods of adjusting operational fuel dilution may include wherein the operational fuel dilution may be, at least in part, based on a blowby rate for the internal combustion engine or the blowby rate for the internal combustion engine may be based, at least in part, on the operational fuel dilution. As a nonlimiting example, fuel dilution may be correlated to the blowby rate (which may be proportional to a ratio of the second temperature factor ($\beta_2$) to the second temperature factor ($\beta_1$), as described previously). Generally, blowby rate change and change in fuel dilution may be calculated according to Equation 4 below.

$$\frac{B_2}{B_1} = \text{Change in fuel dilution} = \beta_2/\beta_1 \tag{4}$$

Figure 3:
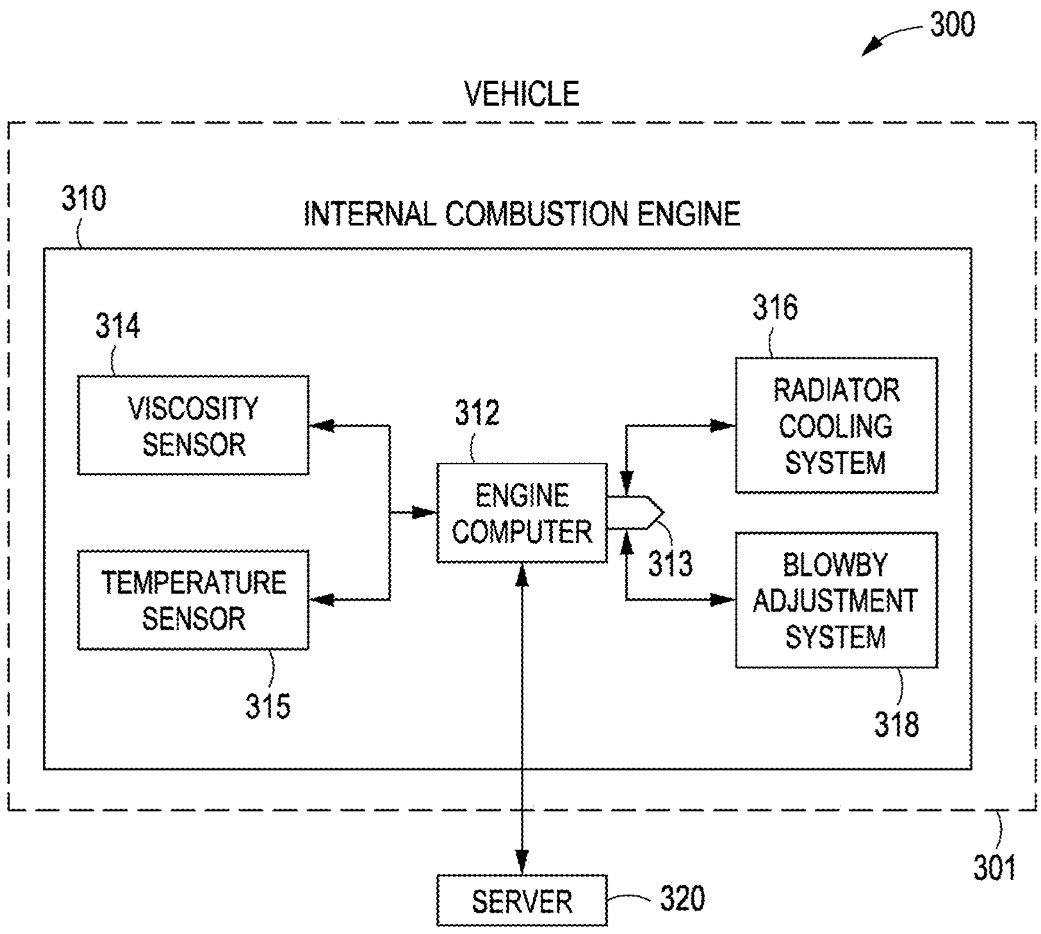
FIG. 3 is a diagram of a nonlimiting example system according to the present disclosure.

Such methods described above may allow for mitigated fuel dilution increases due to change from a first fuel to a second fuel of an internal combustion engine (e.g., from a conventional fuel to an advanced sustainable fuel). Such methods may be implemented through a system. A nonlimiting example system 300 according to the present disclosure is shown in FIG. 3. The system 300 includes internal combustion engine 310 which may optionally be located within a vehicle 301. Vehicle 301 may be at least partially powered by internal combustion engine 310, including being primarily or wholly powered by the internal combustion engine. As a nonlimiting example, the vehicle may be a hybrid-powered vehicle, wherein the vehicle is powered by an electric motor and an internal combustion engine.

The system 300 may include sensors including viscosity sensor 314 and temperature sensor 315. Viscosity sensor 314 may measure viscosity of the lubricant oil of the engine 310. Any suitable viscosity sensor may be used. Temperature sensor 315 may measure operating temperature of the engine 310. Any suitable temperature sensor may be used. The viscosity sensor 314 and the temperature sensor 315 may each be in communication with an engine computer 312. Engine computer 312 may be used for preprocessing and/or execution of methods of the present disclosure as described herein. Engine computer 312 may optionally be in communication with server 320, the server being external to engine 310 (and external to optional vehicle 301 if included in the system 300) and connected to engine 310 through a network means (e.g., a wired network, a wireless network, or any combination thereof). Server 320, if included, may be used for requesting and/or downloading data including, but not limited to, for example, one or more distillation datasets, one or more reference temperatures, the like, or any combination thereof to the engine computer 312 for use in methods described herein. It should be noted that the aforementioned data (e.g., one or more distillation datasets, one or more reference temperatures, the like, or any combination thereof) may be stored within engine computer 312, server 320, any other suitable location, or any combination thereof, including in combinations including storage in multiple locations.

Engine computer 312 may subsequently initiate an adjustment signal 313. Such an adjustment signal 313 may cause the system 300 to adjust fuel dilution of the lubricant composition. The adjustment signal 313 may be a function of factors including, but not limited to, the adjustment temperature, the first temperature factor, the second temperature factor, and the like, or any combination thereof.

System 300 may furthermore include radiator-cooling system 316 within the internal combustion engine 310. Such radiator cooling system 316 may be in communication with the engine computer 312 and may be used for adjustment of operating parameters including engine-operating temperature of the engine 310 for mitigation of fuel dilution. System 300 may furthermore include blowby adjustment system 318 within the internal combustion engine 310. Such blowby adjustment system 318 may be in communication with the engine computer 312 and may be used for adjustment of operating parameters in the engine 310 for mitigation of fuel dilution, including, but not limited to, for example, adjustment of operating parameters (e.g., engine operating temperature) based on a blowby rate of the engine.

In embodiments, engine computer 312 may be implemented on a computing device having at least one processor and computer-readable memory. The computing device may include software, firmware, hardware, or a combination thereof. A communication interface and transceiver can be included to perform data communication (wired or wireless) over a data network. In embodiments, engine computer 312 may be implemented as a separate component or as part of an embedded computing system within a vehicle. Engine computer 312 may comprise, but is not limited to, for example, an engine control unit (ECU), an engine control module (ECM), the like, or any combination thereof.

In embodiments, engine computer 312 may have a processor that can use a single, dual, or other multi-processor architecture. The processor can include one or more of a microprocessor, a microcontroller, an embedded processor, a digital signal processor (DSP), a central processing unit (CPU), a graphics processing unit (GPU), a neural processing unit (NPU), a vision processing unit (VPU), a field-programmable gate array (FPGA), a quantum processor, an application-specific integrated circuit (ASIC), or other like units for processing computer-executable (e.g., machine-readable) instructions.

In embodiments, server 320 may also be implemented on a computing device having at least one processor and computer-readable memory. The computing device for server 320 may include software, firmware, hardware, or a combination thereof. A communication interface and transceiver can be included to perform data communication (wired or wireless) over a data network. Server 320 can also be part of a cluster of servers, platform or cloud-based service.

In embodiments, server 320 may have a processor that can use a single, dual, or other multi-processor architecture. The processor can include one or more of a microprocessor, a microcontroller, an embedded processor, a digital signal processor (DSP), a central processing unit (CPU), a graphics processing unit (GPU), a neural processing unit (NPU), a vision processing unit (VPU), a field-programmable gate array (FPGA), a quantum processor, an application-specific integrated circuit (ASIC), or other like units for processing computer-executable (e.g., machine-readable) instructions. In further embodiments, server 320 may be coupled to one or more other servers as part of a server farm, server cluster or cloud-services platform. Web servers may also be integrated with or coupled to server 320 to support web operations and enable communications with engine computer 312 through Web protocols and networking layers.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 4:
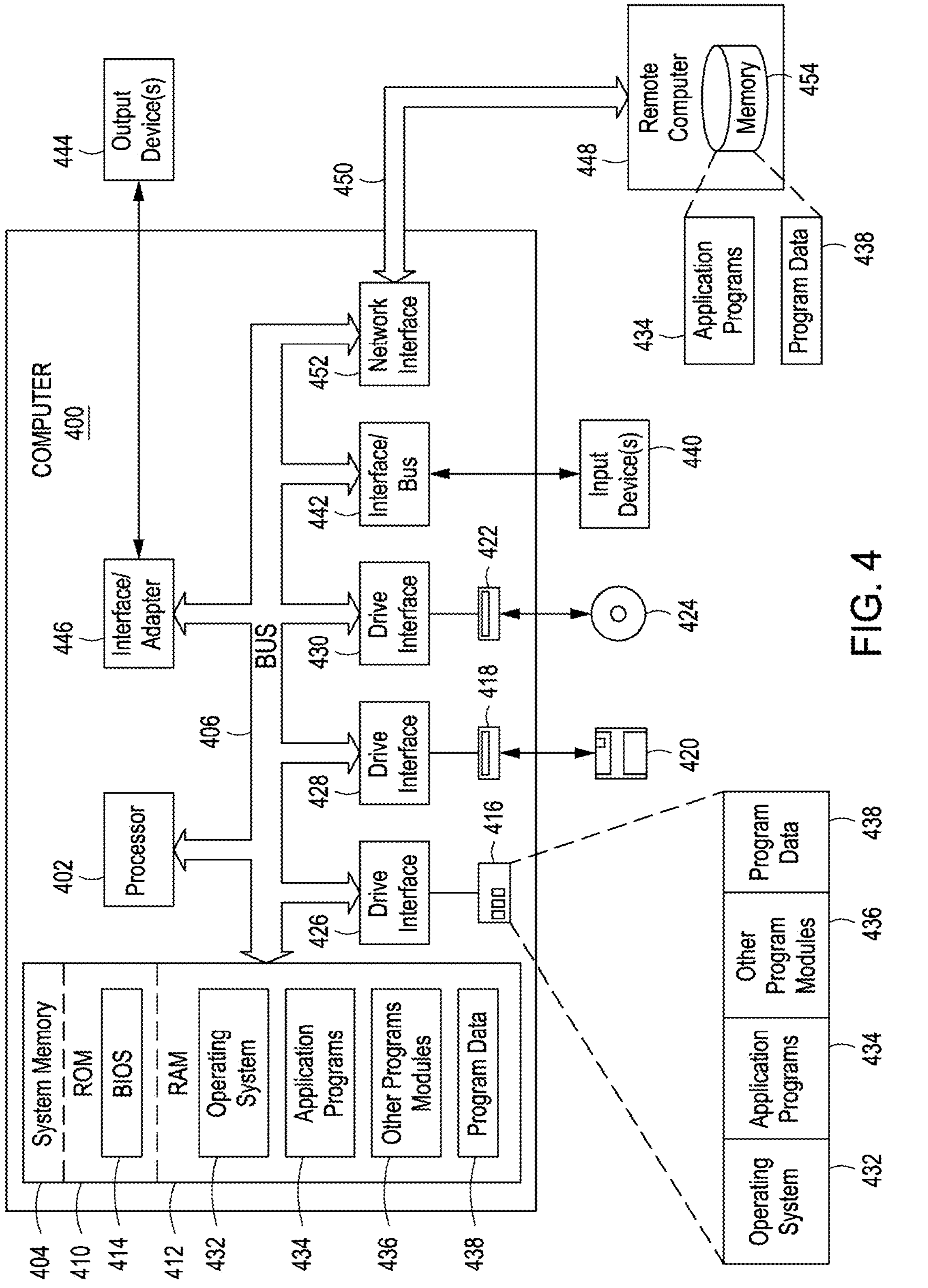
FIG. 4 is a diagram of an example computer system that can be employed to execute one or more embodiments of the present disclosure.

In this regard, FIG. 4 illustrates one example of a computer system 400 that can be employed to execute one or more embodiments of the present disclosure. For example, engine computer 312 and/or server 320 may each be implemented on computer system 400 in embodiments. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. System memory 404 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 402. System bus 406 may be any of several types of bus structure including a memory bus or memory controller, a peripheral bus, and a local bus using any of a variety of bus architectures. System memory 404 includes read-only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 412, including operating system 432, one or more application programs 434, other program modules 436, and program data 438. In some examples, the application programs 434 can include logic or instructions to perform the comparison of measured viscosity and reference viscosity and determination whether fuel dilution is acceptable (e.g., blocks 204 and 205 of FIG. 2), calculation of fuel dilution and confirmation (e.g., blocks 206 and 208 of FIG. 2), calculation of temperature factors and optimized adjustment temperature (e.g., blocks 210 and 212 of FIG. 2), adjustment of engine operating parameters for fuel dilution adjustment (e.g., block 214 of FIG. 2), and the like. In some examples, the program data 438 can include engine operating temperature, measured viscosity, estimated fuel dilution, reference fuel dilution, reference lubricant viscosity, a fuel distillation dataset, a temperature factor, an optimized adjustment temperature, a blowby rate, and the like. The application programs 434 and program data 438 can include functions and methods programmed to measure conditions of the internal combustion engine and perform calculations and methods to mitigate fuel dilution, such as shown and described herein.

A user may enter commands and information into computer system 400 through one or more input devices 440, such as a pointing device (e.g., a mouse or touch screen), keyboard, microphone, joystick, game pad, scanner, and the like. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 400, or portions thereof, may be stored in a remote memory storage device 454.

Fuels

Fuels suitable for use in systems of the present disclosure may include conventional fuels, advanced sustainable fuels, the like, or any combination thereof. Advanced sustainable fuels of relevance to the present disclosure may include, but are not limited to, for example, synthetic fuels, methanol to gasoline fuels, ethanol to gasoline process fuels, biofuels, refined fuels, fuels from waste materials, the like, or any combination thereof. Methods of the present disclosure are described in relation to a first fuel and a second fuel, wherein the second fuel is the fuel operating within the internal combustion engine. The first fuel, therefore, may serve as a reference fuel, including as a reference fuel conventionally operated in the internal combustion engine. Said reference fuel may conventionally operate in the internal combustion engine in question at a known reference temperature. The first fuel may comprise a petroleum-based fuel. The second fuel may comprise an advanced sustainable fuel. As a first nonlimiting example, the first fuel may be a petroleum-based fuel and the second fuel may be a synthetic fuel. As a second nonlimiting example, the first fuel may be a petroleum-based fuel and the second fuel may be a biofuel.

Lubricant Compositions

Methods described herein may be implemented with any suitable lubricant compositions. In particular, lubricant compositions suitable for use in the present disclosure may include one or more oil base stocks and one or more antioxidants.

The oil base stock components used herein may include any of the well-known American Petroleum Institute (API) categories of Group I through Group V, including combinations thereof. The API defines Group I stocks as solvent-refined mineral oils. Group I stocks contain the least saturates and highest amount of sulfur and generally have the lowest viscosity indices. Group II and III stocks are high viscosity index and very high viscosity index base stocks, respectively. The Group III oils generally contain fewer unsaturates and sulfur than the Group II oils.

Group IV stocks consist of polyalphaolefins, which are produced via the catalytic oligomerization of linear alphaolefins (LAOs), particularly LAOs selected from C5-C14 alphaolefins, including, but not limited to, from 1-hexene to 1-tetradecene, 1-octene to 1-dodecene, and mixtures thereof, with 1-decene being the preferred material, although oligomers of lower olefins such as ethylene and propylene, oligomers of ethylene/butene-1 and isobutylene/butene-1, and oligomers of ethylene with other higher olefins, as described in U.S. Pat. No. 4,956,122 and the patents referred to therein, and the like, or any combinations thereof may also be used. Additional further description of suitable polyalphaolefins may be found in U.S. Pat. No. 11,345,872.

Group V includes all the other base stocks not included in Groups I through IV. Group V base stocks includes lubricants based on or derived from esters. Group V additionally includes alkylated aromatics, polyalkylene glycols (PAGs), alkylated naphthalene, the like, or any combination thereof.

An antioxidant can serve to retard the oxidative degradation of the oil base stock. Such degradation could result in deposits on metal surfaces, the presence of sludge, or a viscosity increase in the lubricant composition. The antioxidant can be or can include, but is not limited to, a phenolic antioxidant, an aminic antioxidant, a polyaminic antioxidant, the like, or combinations thereof. The antioxidant may be present in the lubricant compositions at a concentration from about 0.1 mass % to about 10.0 mass % (or about 0.1 mass % to about 8 mass %, or about 0.1 mass % to about 5 mass %, or about 1 mass % to about 5 mass %), by total mass of the lubricant composition, or any suitable concentration.

The phenolic antioxidant is typically a hindered phenolic which contains a sterically hindered hydroxyl group, including, but not limited to, those derivatives of dihydroxy aryl compounds in which the hydroxyl groups are in the o- or p-position to each other. Suitable hindered phenols can include, but are not limited to, hindered phenols substituted with $C_{6+}$ alkyl groups and the alkylene coupled derivatives of those hindered phenols such as 2-t-butyl-4-heptyl phenol, 2-t-butyl-4-octyl. An antioxidant can serve to retard the oxidative degradation of the oil base stock. Such degradation could result in deposits on metal surfaces, the presence of sludge, or a viscosity increase in the lubricant composition. The antioxidant can be or can include, but is not limited to, a phenolic antioxidant, an aminic antioxidant, a polyaminic antioxidant, the like, or combinations thereof. The antioxidant may be present in the lubricant compositions at a concentration from about 0.1 mass % to about 10.0 mass % (or about 0.1 mass % to about 8 mass %, or about 0.1 mass % to about 5 mass %, or about 1 mass % to about 5 mass %), by total mass of the lubricant composition.

The phenolic antioxidant is typically a hindered phenolic which contains a sterically hindered hydroxyl group, including, but not limited to, those derivatives of dihydroxy aryl compounds in which the hydroxyl groups are in the o- or p-position to each other. Suitable hindered phenols can include, but are not limited to, hindered phenols substituted with $C_{6+}$ alkyl groups and the alkylene coupled derivatives of those hindered phenols such as 2-t-butyl-4-heptyl phenol, 2-t-butyl-4-octyl phenol, 2-t-butyl-4-dodecyl phenol, 2,6-di-t-butyl-4-heptyl phenol, 2,6-di-t-butyl-4-dodecyl phenol, 2-methyl-6-t-butyl-4-heptyl phenol, and 2-methyl-6-t-butyl-4-dodecyl phenol. Other useful hindered mono-phenolic antioxidants can include, but are not limited to, hindered 2,6-di-alkyl-phenolic proprionic ester derivatives. Bis-phenolic antioxidants can also be advantageously used in combination with the hindered phenolic antioxidants. Suitable ortho-coupled phenols can include, but are not limited to: 2,2'-bis(4-heptyl-6-t-butyl-phenol); 2,2'-bis(4-octyl-6-t-butyl-phenol); and 2,2'-bis(4-dodecyl-6-t-butyl-phenol). Suitable para-coupled bisphenols can include: 4,4'-bis(2,6-di-t-butyl phenol); and 4,4'-methylene-bis(2,6-di-t-butyl phenol).

The aminic antioxidant is typically an aromatic amine antioxidant. Suitable amine antioxidants can include alkylated and non-alkylated aromatic amines such as aromatic monoamines of the formula $R^8R^9R^{10}N$, where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$, where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ can include from 1 to 20 carbon atoms and preferably include from 6 to 12 carbon atoms. Preferably, both $R^8$ and $R^9$ are aromatic or substituted aromatic groups, where the aromatic group can be a fused ring aromatic group such as naphthyl.

Suitable aromatic amine antioxidants can have alkyl substituent groups of at least 6 carbon atoms. Examples of aliphatic groups can include hexyl, heptyl, octyl, nonyl, and decyl. Typically, the aliphatic groups do not contain more than 14 carbon atoms. The general types of amine antioxidants useful in the lubricant composition disclosed herein include diphenylamines, phenyl naphthylamines, phenothiazines, imidodibenzyls and diphenyl phenylene diamines. Mixtures of two or more aromatic amines can be used. Particular examples of suitable aromatic amine antioxidants include: p,p'-dioctyldiphenylamine; t-octylphenyl-alpha-naphthylamine; phenyl-alpha-naphthylamine; and p-octylphenyl-alpha-naphthylamine. Polymeric aminic antioxidants derived from these diphenylamines, phenyl naphthylamines, and their mixtures can also be used. The polymeric aminic antioxidants may be available in a concentrate form with active polymeric amines in the 10 mass % to 40 mass % range. Such polymeric aminic antioxidant concentrates may include, but are not limited to, Nycoperf AO 337 (available from Nyco S.A.).

Other suitable aminic antioxidants include, but are not limited to, polymeric or oligomeric amines which are the polymerization reaction products of one or more substituted or hydrocarbyl-substituted diphenyl amines, one or more unsubstituted or hydrocarbyl-substituted phenyl naphthyl amines, or both one or more of unsubstituted or hydrocarbyl-substituted diphenylamine with one or more unsubstituted or hydrocarbyl-substituted phenyl naphthylamine. A representative schematic is presented below:

(a)

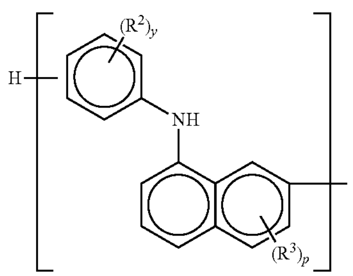

and

-continued (b)

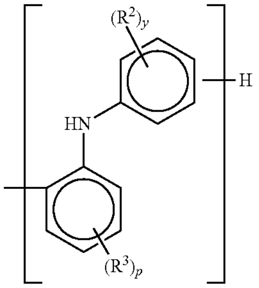

wherein (a) and (b) each range from zero to 10, preferably zero to 5, more preferably zero to 3, most preferably 1 to 3, provided (a)+(b) is at least 2, for example:

(A)

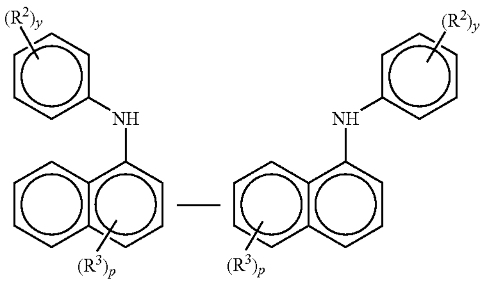

or (B)

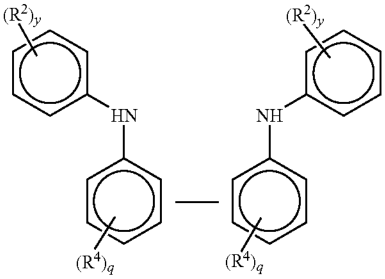

or (C)

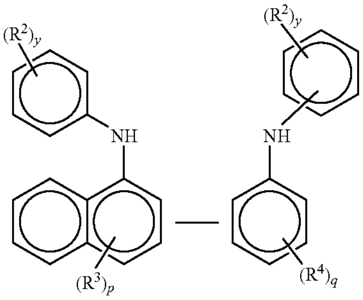

or

-continued (D)

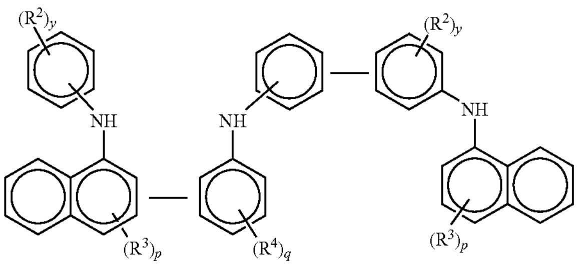

where $R^2$ is a styrene or $C_1$ to $C_{30}$ alkyl, $R^3$ is a styrene or $C_1$ to $C_{30}$ alkyl, $R^4$ is a styrene or $C_1$ to $C_{30}$alkyl, preferably $R_2$ is a $C_1$ to $C_{30}$ alkyl, $R_3$ is a $C_1$ to $C_{30}$alkyl, $R_4$ is a $C_1$ to $C_{30}$ alkyl, more preferably $R_2$ is a $C_4$ to $C_{10}$alkyl, $R_3$ is a $C_4$ to $C_{10}$alkyl and $R_4$ is a $C_4$ to $C_{10}$alkyl, p, q and y individually range from 0 to up to the valence of the aryl group to which the respective R group(s) are attached, preferably at least one of p, q and y range from 1 to up to the valence of the aryl group to which the respective R group(s) are attached, more preferably p, q and y each individually range from at least 1 to up to the valence of the aryl group to which the respective R groups are attached. Other more extensive oligomers are within the scope of this disclosure, but materials of formulae A, B, C and D are preferred. Examples can also be found in U.S. Pat. No. 8,492,321.

An antiwear additive may be included in lubricant compositions of the present disclosure. Antiwear additives can serve to reduce wear between engine parts. The antiwear additive may be included in the lubricant composition at concentrations, by total weight of the lubricant composition, from about 0.01 wt % to about 6.0 wt % (or about 0.01 wt % to about 3.0 wt %, or about 0.1 wt % to about 6.0 wt %, or about 0.1 wt % to about 3.0 wt %). Any suitable antiwear additives may be used.

The ashless antiwear additive can be or can include an amine phosphate, an over-neutralized amine phosphate, or combinations thereof. The amine phosphate can be prepared by reacting an amine compound or a polyamine compound with a phosphoric acid. Suitable amines are disclosed in U.S. Pat. No. 4,234,435, the relevant portions thereof being incorporated by reference herein. An “over-neutralized” amine phosphate is preferred, meaning that a more than sufficient amount of amine is added to neutralize an acid phosphate, and this neutralization can be done with one or more amines.

The phosphorus compounds disclosed herein can be prepared by well known reactions. For example, they can be prepared by the reaction of an alcohol or a phenol with phosphorus trichloride or by a transesterification reaction. C6 to C12 alcohols and alkyl phenols can be reacted with phosphorus pentoxide to provide a mixture of an alkyl or aryl phosphoric acid and a dialkyl or diaryl phosphoric acid. Alkyl phosphates can also be prepared by the oxidation of the corresponding phosphites. In any case, the reaction can be conducted with moderate heating. Moreover, various phosphorus esters can be prepared by reaction using other phosphorus esters as starting materials. Thus, medium chain (C6 to C22) phosphorus esters can be prepared by reaction of dimethylphosphite with a mixture of medium-chain alcohols by means of a thermal transesterification or an acid- or base-catalyzed transesterification; see for example U.S. Pat. No. 4,652,416. Such materials are also commercially available: for instance, triphenyl phosphite is available from Albright and Wilson as DURAPHOS TPP™; di-n-butyl hydrogen phosphite is available from Albright and Wilson as DURAPHOS DBHP™; and triphenylthiophosphate is available from BASF as IRGALUBE TPPT™.

An alkyl or aryl phosphoric acid and a dialkyl or diaryl phosphoric acid, or their mixtures, can be neutralized by one or more amines. Amines that can form amine salts with such phosphoric acids include, for example, mono-substituted amines, di-substituted amines and tri-substituted amines. Examples of mono-substituted amines include butylamine, pentylamine, hexylamine, cyclohexylamine, octylamine, laurylamine, stearylamine, oleylamine and benzylamine. Examples of di-substituted amines include dibutylamine, dipentylamine, dihexylamine, dicyclohexylamine, dioctylamine, dilaurylamine, ditridecylamine, distearylamine, dioleylamine, dibenzylamine, stearyl monoethanolamine, decyl monoethanolamine, hexyl monopropanolamine, benzyl monoethanolamine, phenyl monoethanolamine, and tolyl monopropanolamine. Examples of tri-substituted amines include tibutylamine, tripentylamine, trihexylamine, tricyclohexylamine, trioctylamine, trilaurylamine, tristearylamine, trioleylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine, and tripropanolamine.

Polyamines that can form salts with the phosphoric acids provided herein include, but are not limited to, for example, alkoxylated diamines, fatty polyamine diamines, alkylenepolyamines, hydroxy containing polyamines, condensed polyamines arylpolyamines, and heterocyclic polyamines. Examples of fatty diamines include, but are not limited to, mono- or dialkyl, symmetrical or asymmetrical ethylene diamines, propane diamines (1,2, or 1,3), and polyamine analogs of the above. Suitable commercial fatty polyamines include, but are not limited to, DUOMEEN® C (N-coco-1, 3-diaminopropane), DUOMEEN® S (N-soya-1,3-diaminopropane), DUOMEEN® T (N-tallow-1,3-diaminopropane), and DUOMEEN® O (N-oleyl-1,3-diaminopropane). "DUOMEEN®" chemicals are commercially available from Nouryon.

Examples of alkylenepolyamines include, but are not limited to, methylenepolyamines, ethylenepolyamines, butylenepolyamines, propylenepolyamines, pentylenepolyamines, the like, or any combination thereof. The higher homologs and related heterocyclic amines such as piperazines and N-amino alkyl-substituted piperazines are also included. Specific examples of such polyamines include, but are not limited to, ethylenediamine, triethylenetetramine, tris-(2-aminoethyl)amine, propylenediamine, trimethylenediamine, tripropylenetetramine, tetraethylenepentamine, hexaethyleneheptamine, pentaethylenehexamine, the like, or any combination thereof. Higher homologs obtained by condensing two or more of the above-noted alkyleneamines are similarly useful as are mixtures of two or more of the aforedescribed polyamines. Ethylenepolyamine are described in detail under the heading Ethylene Amines in Kirk Othmer's "Encyclopedia of Chemical Technology," 2d Edition, Vol. 7, pages 22-37, Interscience Publishers, New York (1965). Ethylenepolyamines are often a complex mixture of polyalkylenepolyamines, including cyclic condensation products.

Other useful types of polyamine mixtures are those resulting from the stripping of mixtures of the above-described polyamines to leave, as residue, what is often termed "polyamine bottoms." In general, alkylenepolyamine bottoms can be characterized as having less than 2 mass %, usually less than 1 mass %, of material boiling below about 200° C. A typical sample of such ethylene polyamine bottoms obtained from the Dow Chemical Company of Freeport, Tex. is designated "E-100." These alkylenepolyamine bottoms include cyclic condensation products such as piperazine and higher analogs of diethylenetriamine, triethylenetetramine, and the like. The alkylenepolyamine bottoms can be reacted solely with the acylating agent or they can be used with other amines, polyamines, or mixtures thereof. Another useful polyamine is a condensation reaction between at least one hydroxy compound with at least one polyamine reactant containing at least one primary or secondary amino group. The hydroxy compounds are preferably polyhydric amines. Polyhydric amines can include, but are not limited to, any of the above-described monoamines reacted with an alkylene oxide (e.g., ethylene oxide, propylene oxide, butylene oxide, the like, or any combination thereof) having from two to about 20 carbon atoms, or from two to about four. Examples of polyhydric amines include, but are not limited to, tri-(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl) ethylenediamine, preferably tris(hydroxymethyl) aminomethane (THAM). Other heterocyclic amines can also include, but are not limited to, aromatic polycyclic amines. Examples of aromatic polycyclic amines include, but are not limited to, tolytriazole and benzotriazole.

The amines mentioned above can be used as a neutralization agent for the alkyl or aryl phosphoric acid, dialkyl or diaryl phosphoric acid, or their mixtures as well as an over-neutralization agent to obtain an overbased alkyl or aryl phosphate, or a dialkyl or diary phosphate, or their mixtures. The preferred amine phosphate is a dialkylphosphoric acid, first neutralized with a dialkyl amine, and then over-neutralized with a tolytriazole. More preferably, the dialkylphosphoric acid is a dihexylphosporic acid.

The other phosphates that could be used as ashless antiwear include triaryl phosphates, trialkyl phosphates, trialkylaryl phosphates, triarylalkyl phosphates and trialkenyl phosphates. As specific examples of these, referred to are triphenyl phosphate, tricresl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, propylphenyldiphenyl phosphate, dipropylphenylphenyl phosphate, triethylphenyl phosphate, tripropylphenyl phosphate, butylphenyldiphenyl phosphate, dibutyphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Lubricant compositions of the present disclosure may additionally contain one or more additional additives including, but not limited to, for example, dispersants, other detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, the like, or any combination thereof. The types and quantities of additional additives used in combination with the present disclosure in lubricant compositions are not limited by the examples shown herein as illustrations.

Lubricant compositions of the present disclosure may have properties suitable for use in methods described herein. For example, lubricant compositions of the present disclosure may give about 10 mg or less (or about 0 mg to about 10 mg, or about 0.01 mg to about 10 mg, or about 0.01 to about 5 mg, or 10 mg or less) total deposits in TEOST MHT4 (ASTM D7097) testing. Such low deposits may reduce wear on components of an internal combustion engine and thus may allow for longer use of lubricant compositions within said engine.

Furthermore, lubricant compositions of the present disclosure may give the above total deposits in the presence of depositor compounds. Such compounds may be commonly present in advanced sustainable fuels and many conventionally contribute to increased deposits. Depositor compounds may include, but are not to be limited to, for example, heavy olefins and heavy aromatics, diethyl benzene, mesitylene, the like, or any combination thereof. Such depositor compounds may penetrate into the lubricant composition. Lubricant compositions of the present disclosure may have total deposits in TEOST MHT4 (ASTM D7097) testing results described above at depositor compound concentrations from 0.01 wt % to 20 wt %, or 0.01 wt % to 15 wt %, or 0.01 wt % to 10 wt %, or 0.01 wt % to 5 wt %, or about 15 wt % or less, or about 10 wt % or less, or about 5 wt % or less), by total weight of the lubricant composition.

As a further example, lubricant compositions of the present disclosure may exhibit high temperature high shear viscosity (ASTM D4683) greater than 3.5 cP (or 2.5 cP to 4.5 cP, or 3.5 cP to 10 cP, or 3 cP to 6 cP, or greater than 3 cP, or 3 cP to 5 cP, or 5 cP to 10 cP, or 1 cP to 3 cP, or 2 cP to 4 cP).

Experiment 1

A lubricant composition (Sample A) was formulated for use as an engine oil in an internal combustion engine operating with an advanced sustainable fuel. Sample A included synthetic hydrocarbon base stocks comprising polyalphaolefins, alkylated naphthalene, phenolic and aminic antioxidants, as well as zinc dialkyldithiophosphate and molydithiocarbamate. Specific compositions of Sample A are shown in Table 4 below.

TABLE 4

Sample A formulation.

| Component | Quantity (wt %) |
|---|---|
| Hydrocarbon Basestock #1 (Polyalphaolefin) | 69.64 |
| Hydrocarbon Basestock #2 (Polyalpholefin) | 11.5 |
| Alkylated naphthalene | 5.18 |
| Phenolic Antioxidant | 0.75 |
| Aminic Antioxidant | 0.75 |
| Zinc Dialkyldithiophosphate | 1.36 |
| Molydithiocarbamate | 2 |
| Other Additives | 8.82 |

Hydrocarbon basestock density in Sample A was tested, and Sample A as a whole was tested for viscosity and various trace element contents. Results are shown for each test in Table 5 below.

TABLE 5

Sample A testing results.

| Test | Unit | Value |
|---|---|---|
| Density (API Gravity, 15.6° C.) | g/mL | 0.8503 |
| HTHS Viscosity (ASTM D4683/CEC-L-)36 | mPa · s | 3.5 |
| Phosphorus (ASTM D5185) | ppm | 1185 |
| Boron Content (ASTM D5185) | ppm | 106 |
| Calcium Content (ASTM D5185) | ppm | 1111 |
| Magnesium Content (ASTM D5185) | ppm | 762 |
| Zinc Content (ASTM D5185) | ppm | 1277 |
| Molybdenum Content (ASTM D5185) | ppm | 1055 |

Furthermore, Sample A produced a TEOST MHT 4 (ASTM D7097) value of 4.3 mg (with no fuel present). Testing was repeated with heavy fuel model compounds (diethyl benzene or mesitylene) included in samples. Samples B1-B3, each comprised Sample A having diethyl benzene added to the lubricant composition at 5 wt %, 10 wt %, and 15 wt %, respectively. For Samples B1, B2, and B3 TEOST MHT4 (ASTM D7097) total deposits when tested were 4.7 mg, 2.4 mg, and 5.7 mg, respectively. Similarly, Samples C1-C3 were formulated, each comprising Sample A having mesitylene added to the lubricant composition at 5 wt %, 10 wt %, and 15 wt %, respectively. For Samples C1, C2, and C3 TEOST MHT4 (ASTM D7097) total deposits when tested with heavy fuel compound were 2.9 mg, 4.1 mg, and 0.8 mg, respectively. Thus, the low levels of deposits (less than 10 mg) for Samples B1-B3 and $C_1$-$C_3$ in the presence of heavy fuel model compounds were found to be below 35 mg, the TEOST MHT4 limit for ILSAC GF-5 and API SN Plus engine oil specification.

Additional Embodiments

Embodiment 1. A method comprising: storing in computer-readable memory a first fuel distillation dataset for a lubricant composition operating with a first fuel, a second fuel distillation dataset for the lubricant composition operating with a second fuel; calculating with at least one processor a first temperature factor for the first fuel at a reference temperature, wherein the first temperature factor is a function of the first fuel distillation dataset and the reference temperature; calculating with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature; and adjusting an operational fuel dilution of the lubricant composition in an internal combustion engine based on the optimized adjustment temperature, wherein the internal combustion engine is operating on the second fuel.

Embodiment 2. The method of Embodiment 1, further comprising: obtaining a measured lubricant viscosity with a viscosity sensor in the internal combustion engine, wherein the viscosity sensor is in communication with an engine computer; and determining with the at least one processor if the measured lubricant viscosity is within a first range of a reference lubricant viscosity.

Embodiment 3. The method of Embodiment 2, further comprising: calculating with the at least one processor an estimated operational fuel dilution based on the measured lubricant viscosity; and determining with the at least one processor if the estimated operational fuel dilution is within a second range of a reference fuel dilution.

Embodiment 4. The method of any one of Embodiments 1-3, further comprising: calculating with the at least one processor fuel dilution change, wherein the fuel dilution change is equal to the first overall temperature factor divided by the second overall temperature factor.

Embodiment 5. The method of any one of Embodiments 1-4, wherein the first fuel distillation dataset includes a first plurality of boiling point fraction datasets for intervals of boiling point of the first fuel, wherein the second fuel distillation dataset comprises a second plurality of boiling point fraction datasets for intervals of boiling point of the second fuel, and wherein each boiling point fraction dataset includes an average boiling temperature and a weight fraction percentage.

Embodiment 6. The method of any one of Embodiments 1-5, wherein the first fuel is a petroleum-based fuel, and wherein the second fuel is an advanced sustainable fuel.

Embodiment 7. The method of any one of Embodiments 1-6, wherein the first fuel is a petroleum-based fuel, and wherein the second fuel is a biofuel.

Embodiment 8. The method of any one of Embodiments 1 or 3-7, wherein the at least one processor is located within an engine computer within a vehicle, and wherein the vehicle is powered primarily by the internal combustion engine.

Embodiment 9. The method of any one of Embodiments 1-8, further comprising: calculating the first fuel distillation dataset and the second fuel distillation dataset from distillation data based on ASTM D86.

Embodiment 10. The method of any one of Embodiments 1-9, wherein adjusting the operational fuel dilution comprises accounting for blowby rate of the internal combustion engine.

Embodiment 11. The method of any one of Embodiments 1-10, wherein adjusting the operational fuel dilution comprises adjusting an engine operating temperature, wherein the adjustment of the engine operating temperature is based on the optimized adjustment temperature.

Embodiment 12. The method of any one of Embodiments 1-11, wherein adjusting the operational fuel dilution comprises adjusting a radiator cooling system of the internal combustion engine.

Embodiment 13. The method of any one of Embodiments 1-12, wherein the lubricant composition comprises: at least one hydrocarbon basestock, about 0.50 wt % to about 1.0 wt % of at least one aminic antioxidant, and about 0.50 wt % to about 1.0 wt % of at least one phenolic antioxidant; wherein weight percentages are of a total weight of the lubricant composition; and wherein the lubricant composition has less than 10 mg total deposits from TEOST MHT4 (ASTM D7097).

Embodiment 14. The method of Embodiment 13, wherein the lubricant composition maintains the total deposits less than 10 mg from TEOST MHT4 (ASTM D7097) in the presence of a depositor compound; and wherein the depositor compound comprises: a) about 0.01 wt % to about 15 wt % diethyl benzene, b) about 0.01 wt % to about 15 wt % mesitylene, or c) a and b, wherein weight percentages are of the total weight of the lubricant composition.

Embodiment 15. The method of Embodiment 13 or 14, wherein the lubricant composition has a high temperature high shear viscosity (ASTM D4683) from 2.5 cP to 4.5 cP Embodiment 16. The method of any one of Embodiments 1-15, wherein the tolerance factor is from 0.5 to 2.5.

Embodiment 17. The method of any one of Embodiments 1-16, wherein the tolerance factor is equal to 1.

Embodiment 18. The method of any one of Embodiments 1-17, wherein the at least one processor is disposed within a vehicle housing the internal combustion engine and the storing the first fuel distillation dataset and the second fuel distillation dataset includes: requesting the first fuel distillation dataset and the second fuel distillation dataset from a server, wherein the server is external to a vehicle and wirelessly connected thereto, wherein the vehicle is powered at least partially by the internal combustion engine; and downloading the first fuel distillation dataset and the second fuel distillation dataset from the server to the at least one processor of the vehicle.

Embodiment 19. The method of any one of Embodiments 1-18, wherein the at least one processor is disposed within a vehicle housing the internal combustion engine, and further comprising measuring an engine operating temperature with a temperature sensor configured to communicate with the at least one processor.

Embodiment 20. The method of any one of Embodiments 1-19, wherein the first temperature factor is such that $$\beta_1 = \sum_i x_i * \alpha_i \text{ and } \alpha_i = \exp\left(-T_i(4 + \ln(T_i))\left[\frac{1}{T_1} - \frac{1}{T_i}\right]\right)$$

wherein $\beta_1$ is the first temperature factor, i is each weight fraction within the first distillation dataset, $x_i$ is a weight percentage of the each weight fraction, $T_i$ is an average boiling temperature in Kelvin for the each weight fraction within the first distillation dataset, and $T_1$ is the reference temperature in Kelvin.

Embodiment 21. The method of any one of Embodiments 1-20, wherein the second temperature factor is such that $$\beta_2 = \sum_i x_i * \alpha_i \text{ and } \alpha_i = \exp\left(-T_i(4 + \ln(T_i))\left[\frac{1}{T^*} - \frac{1}{T_i}\right]\right)$$

wherein $\beta_2$ is the second temperature factor, i is each weight fraction within the second distillation dataset, $x_i$ is a weight percentage of the each weight fraction, $T_i$ is an average boiling temperature in Kelvin for the each weight fraction within the second distillation dataset, and $T^*$ is the optimized adjustment temperature in Kelvin.

Embodiment 22. A system for lubricating an internal combustion engine having a lubricant composition therein comprising: a viscosity sensor for measuring an operational lubricant viscosity of the lubricant composition; an engine computer in communication with the viscosity sensor, wherein the engine computer includes at least one processor and a computer-readable memory and is configured to: store in the computer-readable memory a first fuel distillation dataset for the lubricant composition operating with a first fuel, a second fuel distillation dataset for the lubricant composition operating with a second fuel, wherein the internal combustion engine is operating on the second fuel; calculate with the at least one processor a first temperature factor for the first fuel at a reference temperature, wherein the first temperature factor is a function of the first fuel distillation dataset and the reference temperature; calculate with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature; and initiate an adjustment signal, wherein the adjustment signal adjusts an operational fuel dilution of the lubricant composition based on the optimized adjustment temperature.

Embodiment 23. The system of Embodiment 22, further comprising a radiator system for the internal combustion engine wherein the radiator system is configured to receive the adjustment signal and adjust radiator cooling based on the received adjustment signal.

Embodiment 24. The system of Embodiment 23, wherein the radiator is coupled to and adjusts the engine operating temperature.

Embodiment 25. A lubricant composition comprising: at least one hydrocarbon basestock, about 0.50 wt % to about 1.0 wt % of at least one aminic antioxidant, and about 0.50 wt % to about 1.0 wt % of at least one phenolic antioxidant; wherein weight percentages are of a total weight of the lubricant composition, and wherein the lubricant composition has less than 10 mg total deposits from TEOST MHT4 (ASTM D7097).

Embodiment 26. The lubricant composition of Embodiment 25, wherein the lubricant composition maintains the total deposits less than 10 mg from TEOST MHT4 (ASTM D7097) in the presence of a depositor compound; and wherein the depositor compound comprises: a) about 0.01 wt % to about 15 wt % diethyl benzene, b) about 0.01 wt % to about 15 wt % mesitylene, or c) a and b, wherein weight percentages are of the total weight of the lubricant composition.

To facilitate a better understanding of the embodiments of the present invention, the following examples of preferred or representative embodiments are given. In no way should the following examples be read to limit, or to define, the scope of the invention.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

What is claimed is:

1. A method comprising:

storing in computer-readable memory a first fuel distillation dataset for a lubricant composition operating with a first fuel, a second fuel distillation dataset for the lubricant composition operating with a second fuel;

calculating with at least one processor a first temperature factor for the first fuel at a reference temperature, wherein the first temperature factor is a function of the first fuel distillation dataset and the reference temperature;

calculating with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature;

adjusting an operational fuel dilution of the lubricant composition in an internal combustion engine based on the optimized adjustment temperature, wherein the internal combustion engine is operating on the second fuel; and either:

(A) obtaining a measured lubricant viscosity with a viscosity sensor in the internal combustion engine, wherein the viscosity sensor is in communication with an engine computer;

determining with the at least one processor if the measured lubricant viscosity is within a first range of a reference lubricant viscosity;

calculating with the at least one processor an estimated operational fuel dilution based on the measured lubricant viscosity; and determining with the at least one processor if the estimated operational fuel dilution is within a second range of a reference fuel dilution;

or (B) calculating with the at least one processor a fuel dilution change, wherein the fuel dilution change is equal to the first overall temperature factor divided by the second overall temperature factor;

wherein the first fuel distillation dataset includes a first plurality of boiling point fraction datasets for intervals of boiling point of the first fuel, wherein the second fuel distillation dataset comprises a second plurality of boiling point fraction datasets for intervals of boiling point of the second fuel, and wherein each boiling point fraction dataset includes an average boiling temperature and a weight fraction percentage;

and in (A) or (B)

wherein adjusting the operational fuel dilution comprises adjusting an engine operating temperature, wherein the adjustment of the engine operating temperature is based on the optimized adjustment temperature.

2. The method of claim 1, wherein the method comprises calculating with the at least one processor a fuel dilution change, wherein the fuel dilution change is equal to the first overall temperature factor divided by the second overall temperature factor; wherein the first fuel distillation dataset includes a first plurality of boiling point fraction datasets for intervals of boiling point of the first fuel, wherein the second fuel distillation dataset comprises a second plurality of boiling point fraction datasets for intervals of boiling point of the second fuel, and wherein each boiling point fraction dataset includes an average boiling temperature and a weight fraction percentage, and the method further comprises:

obtaining a measured lubricant viscosity with a viscosity sensor in the internal combustion engine, wherein the viscosity sensor is in communication with an engine computer; and determining with the at least one processor if the measured lubricant viscosity is within a first range of a reference lubricant viscosity.

3. The method of claim 2, further comprising:

calculating with the at least one processor an estimated operational fuel dilution based on the measured lubricant viscosity; and determining with the at least one processor if the estimated operational fuel dilution is within a second range of a reference fuel dilution.

4. The method of claim 1, wherein the method comprises obtaining a measured lubricant viscosity with a viscosity sensor in the internal combustion engine, wherein the viscosity sensor is in communication with an engine computer; determining with the at least one processor if the measured lubricant viscosity is within a first range of a reference lubricant viscosity; calculating with the at least one processor an estimated operational fuel dilution based on the measured lubricant viscosity; and determining with the at least one processor if the estimated operational fuel dilution is within a second range of a reference fuel dilution; and the method further comprises:

calculating with the at least one processor a fuel dilution change, wherein the fuel dilution change is equal to the first overall temperature factor divided by the second overall temperature factor.

5. The method of claim 1, wherein the first fuel distillation dataset includes a first plurality of boiling point fraction datasets for intervals of boiling point of the first fuel, wherein the second fuel distillation dataset comprises a second plurality of boiling point fraction datasets for intervals of boiling point of the second fuel, and wherein each boiling point fraction dataset includes an average boiling temperature and a weight fraction percentage.

6. The method of claim 1, wherein the first fuel is a petroleum-based fuel, and wherein the second fuel is an advanced sustainable fuel.

7. The method of claim 1, wherein the at least one processor is located within an engine computer within a vehicle, and wherein the vehicle is powered primarily by the internal combustion engine.

8. The method of claim 1, further comprising:

calculating the first fuel distillation dataset and the second fuel distillation dataset from distillation data based on ASTM D86.

9. The method of claim 1, wherein adjusting the operational fuel dilution comprises accounting for blowby rate of the internal combustion engine.

10. The method of claim 1, wherein the lubricant composition comprises:

at least one hydrocarbon basestock, about 0.50 wt % to about 1.0 wt % of at least one aminic antioxidant, and about 0.50 wt % to about 1.0 wt % of at least one phenolic antioxidant;

wherein weight percentages are of a total weight of the lubricant composition; and wherein the lubricant composition has less than 10 mg total deposits from TEOST MHT4 (ASTM D7097).

11. The method of claim 10, wherein the lubricant composition maintains the total deposits less than 10 mg from TEOST MHT4 (ASTM D7097) in the presence of a depositor compound; and wherein the depositor compound comprises:

a) about 0.01 wt % to about 15 wt % diethyl benzene, b) about 0.01 wt % to about 15 wt % mesitylene, or c) a and b, wherein weight percentages are of the total weight of the lubricant composition.

12. The method of claim 1, wherein the tolerance factor is from 0.5 to 2.5.

13. The method of claim 1, wherein the tolerance factor is equal to 1.

14. The method of claim 1, wherein the at least one processor is disposed within a vehicle housing the internal combustion engine and the storing the first fuel distillation dataset and the second fuel distillation dataset includes:

requesting the first fuel distillation dataset and the second fuel distillation dataset from a server, wherein the server is external to a vehicle and wirelessly connected thereto, wherein the vehicle is powered at least partially by the internal combustion engine; and downloading the first fuel distillation dataset and the second fuel distillation dataset from the server to the at least one processor of the vehicle.

15. The method of claim 1, wherein the at least one processor is disposed within a vehicle housing the internal combustion engine, and further comprising measuring an engine operating temperature with a temperature sensor configured to communicate with the at least one processor.

16. The method of claim 1, wherein the first temperature factor is such that $$\beta_1 = \sum_i x_i * \alpha_i \text{ and } \alpha_i = \exp\left(-T_i(4 + \ln(T_i))\left[\frac{1}{T_1} - \frac{1}{T_i}\right]\right)$$

wherein $\beta_1$ is the first temperature factor, i is each weight fraction within the first distillation dataset, $x_i$ is a weight percentage of the each weight fraction, $T_i$ is an average boiling temperature in Kelvin for the each weight fraction within the first distillation dataset, and $T_1$ is the reference temperature in Kelvin.

17. The method of claim 1, wherein the second temperature factor is such that $$\beta_2 = \sum_i x_i * \alpha_i \text{ and } \alpha_i = \exp\left(-T_i(4 + \ln(T_i))\left[\frac{1}{T^*} - \frac{1}{T_i}\right]\right)$$

wherein $\beta_2$ is the second temperature factor, i is each weight fraction within the second distillation dataset, $x_i$ is a weight percentage of the each weight fraction, $T_i$ is an average boiling temperature in Kelvin for the each weight fraction within the second distillation dataset, and T* is the optimized adjustment temperature in Kelvin.

18. A system for lubricating an internal combustion engine having a lubricant composition therein comprising:

a viscosity sensor for measuring an operational lubricant viscosity of the lubricant composition;

an engine computer in communication with the viscosity sensor, wherein the engine computer includes at least one processor and a computer-readable memory and is configured to:

store in the computer-readable memory a first fuel distillation dataset for the lubricant composition operating with a first fuel, a second fuel distillation dataset for the lubricant composition operating with a second fuel, wherein the internal combustion engine is operating on the second fuel;

calculate with the at least one processor a first temperature factor for the first fuel at a reference temperature, wherein the first temperature factor is a function of the first fuel distillation dataset and the reference temperature;

calculate with the at least one processor an optimized adjustment temperature such that for the second fuel a second temperature factor is equal to a tolerance factor multiplied by the first temperature factor, wherein the second temperature factor is a function of the second fuel distillation dataset and an adjustment temperature; and initiate an adjustment signal, wherein the adjustment signal adjusts an operational fuel dilution of the lubricant composition based on the optimized adjustment temperature.

* * * * *